US009444560B1

(12) United States Patent
Goh

(10) Patent No.: US 9,444,560 B1
(45) Date of Patent: Sep. 13, 2016

(54) METHOD AND APPARATUS FOR IQ IMBALANCE ESTIMATION

(71) Applicant: MARVELL INTERNATIONAL LTD., Hamilton (BM)

(72) Inventor: Wee Peng Goh, Temecula, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/274,504

(22) Filed: May 9, 2014

Related U.S. Application Data

(60) Provisional application No. 61/822,007, filed on May 10, 2013.

(51) Int. Cl.
*H04B 17/00* (2015.01)
*H04L 1/24* (2006.01)

(52) U.S. Cl.
CPC ...... *H04B 17/0015* (2013.01); *H04B 17/0062* (2013.01); *H04L 1/243* (2013.01)

(58) Field of Classification Search
CPC ............ H04B 1/00; H04B 1/10; H04B 1/12; H04B 1/16; H04B 1/38; H04B 1/44; H04B 7/00; H04B 7/08; H04B 17/00; H03K 9/00; H04L 1/00; H04L 1/0001; H04L 5/12; H04L 5/16; H04L 23/02; H04L 25/08; H04L 27/00; H04L 27/22
USPC ........ 370/210; 375/219, 221, 226, 295, 296, 375/316, 317, 324, 329, 350; 455/63.1, 455/67.11, 67.14, 73, 115.1, 226.1, 296, 455/307, 310, 318, 501, 552.1; 714/746
See application file for complete search history.

(56) References Cited

U.S. PATENT DOCUMENTS

| | | | |
|---|---|---|---|
| 6,265,949 B1* | 7/2001 | Oh | 332/103 |
| 7,184,714 B1* | 2/2007 | Kutagulla et al. | 455/73 |
| 8,285,508 B2* | 10/2012 | Yanagisawa et al. | 702/106 |
| 8,290,458 B2* | 10/2012 | Safavi | H04L 27/364 375/296 |
| 8,311,083 B2* | 11/2012 | Ding et al. | 375/219 |
| 2004/0087279 A1* | 5/2004 | Muschallik et al. | 455/73 |
| 2005/0047536 A1* | 3/2005 | Wu | H04L 27/3863 375/346 |
| 2005/0220003 A1* | 10/2005 | Palaskas et al. | 370/210 |
| 2005/0260949 A1* | 11/2005 | Kiss et al. | 455/67.14 |

(Continued)

OTHER PUBLICATIONS

Azenkot, Yehuda, et al., "CueLAN MoCA Receiver Architecture," Version 0.75, *Sigma Designs Inc.*, 122 pages (Nov. 24, 2010).
Azenkot, Yehuda, "MoCA PHY Receiver Architecture," V34. 0.1, *Sigma Designs*, 32 pages (Dec. 16, 2010).

(Continued)

*Primary Examiner* — Sam K Ahn
*Assistant Examiner* — Shawkat M Ali

(57) ABSTRACT

An output of a transmitter is looped back to an input of a receiver during a first time period while applying a frequency offset between the transmitter and the receiver. A first imbalance between an in-phase (I) branch and a quadrature-phase (Q) branch in the receiver is determined based on a signal received at the receiver during the first time period. The receiver is calibrated based on the determined first imbalance. After calibrating the receiver, the output of the transmitter is looped back to the input of the receiver during a second time period during which the frequency offset is not applied. A second imbalance between an I branch in and a Q branch in the transmitter is determined based on a signal received at the receiver during the second time period while the frequency offset is not applied. The transmitter is calibrated based on the determined second imbalance.

19 Claims, 8 Drawing Sheets

(56) References Cited

U.S. PATENT DOCUMENTS

| | | | | |
|---|---|---|---|---|
| 2006/0109893 | A1* | 5/2006 | Chen et al. | 375/219 |
| 2008/0063113 | A1* | 3/2008 | Gao et al. | 375/296 |
| 2008/0166985 | A1* | 7/2008 | Wortel et al. | 455/233.1 |
| 2009/0233562 | A1* | 9/2009 | Kim | H04B 17/14 455/115.1 |
| 2010/0027689 | A1* | 2/2010 | Kohlmann | 375/260 |
| 2010/0232493 | A1* | 9/2010 | Thirumoorthy | 375/232 |
| 2010/0330929 | A1* | 12/2010 | Heutmaker et al. | 455/73 |
| 2011/0069767 | A1* | 3/2011 | Zhu | H04L 27/368 375/259 |
| 2011/0292978 | A1* | 12/2011 | Kravitz | 375/221 |
| 2012/0300818 | A1* | 11/2012 | Metreaud | H04B 1/30 375/219 |
| 2013/0272175 | A1* | 10/2013 | Zargari et al. | 370/281 |

OTHER PUBLICATIONS

Cai, Kerry, "CueLAN RFIC calibration procedures and hardware requirements—For MoCA applications," Version V04, *Sigma Designs Inc.*, 43 pages (Aug. 23, 2010).

French, Cathy, "Project-3—Transmitter IQ Precompensation and Pre-DAC Multiplier Specification," Version 1, *Sigma Designs Inc.*, 8 pages (Jan. 12, 2010).

Goh, Wee P., "CueLAN PHY—CFO/SFO Tracking Loops and Frequency Offset Correction," Verion 1.0, *Sigma Designs Inc.*, 63 pages (Jun. 11, 2010).

Goh, Wee P., "CueLAN PHY—Rx IQ Imbalance Compensation," Version 0.1, *Sigma Designs Inc.*, 9 pages (Jun. 25, 2010).

Goh, Wee P., "CueLAN PHY—Tx IQ Imbalance Pre-compensation," Version 1.1, *Sigma Designs Inc* 13 pages (Jun. 8, 2012).

* cited by examiner

METHOD AND APPARATUS FOR IQ IMBALANCE ESTIMATION

CROSS-REFERENCE TO RELATED APPLICATIONS

This disclosure claims the benefit of U.S. Provisional Patent Application No. 61/822,007, filed May 10, 2013, entitled "CueLAN PHY IQ Imbalance Estimation," the disclosure of which is hereby expressly incorporated herein by reference in its entirety.

FIELD OF THE DISCLOSURE

The present disclosure relates generally to communication devices, and more particularly, to techniques for calibrating such devices.

BACKGROUND

The Multimedia over Coax Alliance (MoCA) has standardized a networking technology for use with home entertainment devices. MoCA networking technology utilizes in-home coaxial cable to distribute media (e.g., video, audio, data, etc.) among different rooms in a house. MoCA technology utilizes orthogonal frequency division multiplexing (OFDM) modulation.

With OFDM transceivers, an imbalance between in-phase (I) and quadrature (Q) paths in the transceiver can lead to degraded performance.

SUMMARY OF THE DISCLOSURE

A transceiver device, comprising a transmitter device, a receiver device, and a loop back path configured to selectively loop back an output of the transmitter device to an input of the receiver device. The transceiver device also comprises a processor device configured to: control the loop back path to loop back the output of the transmitter device to the input of the receiver device during a first time period, control the transmitter device and/or the receiver device to apply a frequency offset between the transmitter device and the receiver device during the first time period, determine a first imbalance between an in-phase (I) branch in the receiver device and a quadrature-phase (Q) branch in the receiver device based on a signal received at the receiver device during the first time period while the frequency offset is applied, calibrate the receiver based on the determined first imbalance, after calibrating the receiver, control the loop back path to loop back loop back the output of the transmitter device to the input of the receiver device during a second time period, control the transmitter device and/or the receiver device so that the frequency offset is not applied during the second time period, determine a second imbalance between an I branch in the transmitter and a Q branch in the transmitter based on a signal received at the receiver device during the second time period while the frequency offset is not applied, and calibrate the transmitter based on the determined second imbalance.

A method for calibrating a transceiver includes looping back an output of a transmitter to an input of a receiver during a first time period while applying a frequency offset between the transmitter and the receiver. The method also includes determining a first imbalance between an in-phase (I) branch in the receiver and a quadrature-phase (Q) branch in the receiver based on a signal received at the receiver during the first time period while the frequency offset is applied. The method additionally includes calibrating the receiver based on the determined first imbalance. The method further includes after calibrating the receiver, looping back the output of the transmitter to the input of the receiver during a second time period during which the frequency offset is not applied. Also, the method includes determining a second imbalance between an I branch in the transmitter and a Q branch in the transmitter based on a signal received at the receiver during the second time period while the frequency offset is not applied, and calibrating the transmitter based on the determined second imbalance.

DETAILED DESCRIPTION

Figure 1:
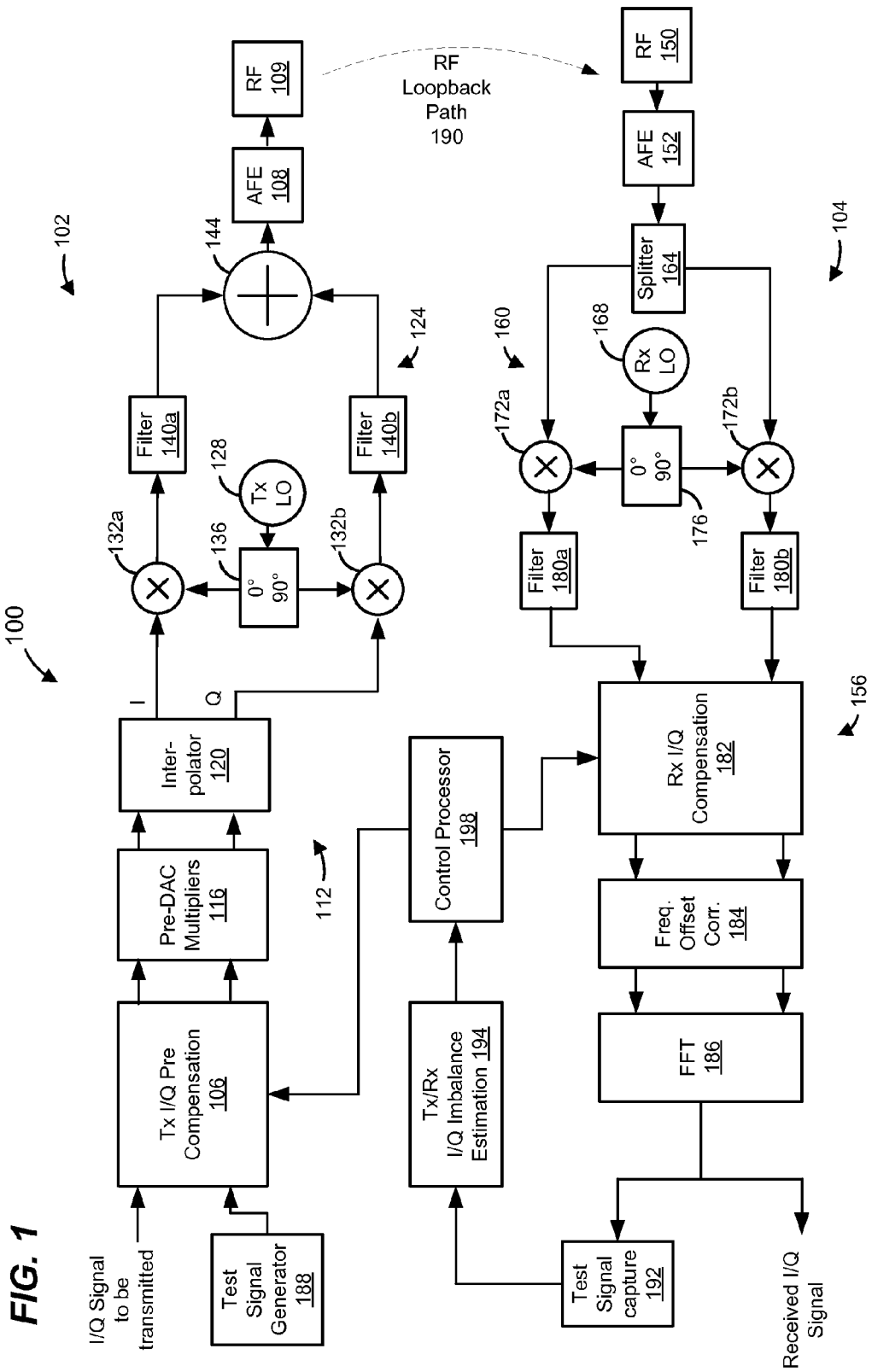
FIG. 1 is a block diagram of an example communication device configured to utilize IQ calibration techniques of the present disclosure, according to an embodiment.

FIG. 1 is a block diagram of an example communication device 100 configured to calibrate and compensate for transmit and receive I/Q imbalance, according to an embodiment. The communication device 100 is configured to operate in a Multimedia over Coax Alliance (MoCA) communication network, in an embodiment. For example, the communication device 100 is configured to operate according to the MoCA 1.0 specification, the MoCA 1.1 specification, and/or the MoCA 2.0 specification, in various embodiments. In some embodiments, the communication device 100 is configured to transmit and to receive signals modulated using orthogonal frequency division multiplexing (OFDM) modulation. The communication device 100 is part of another suitable network and/or is configured to utilize other types of modulation to transmit and receive signals over wireless or wired connections, in other embodiments.

The communication device 100 includes a transmitter device 102 and a receiver device 104. The transmitter device 102 includes a transmit (Tx) I/Q pre-compensation unit 106 coupled to an analog front end (AFE) 108 via a transmit signal processor 112. The AFE 108 is coupled to a radio frequency (RF) transmitter device 109. The transmit signal processor 112 includes an in-phase (I) path and a quadrature (Q) path. The transmit signal processor 112 includes multipliers 116, an interpolator 120, and a mixer 124. The mixer 124 up-converts the in-phase and quadrature components of a baseband signal to an intermediate frequency (IF) to generate an IF signal, and the RF device 109 includes another mixer (not shown) that up-converts the IF signal to an RF frequency corresponding to a communication channel via which an RF signal is to be transmitted, according to an embodiment. In another embodiment, the mixer 124 directly up-converts the in-phase and quadrature components of the baseband signal to the RF frequency corresponding to the communication channel via which an RF signal is to be transmitted.

The mixer 124 includes a local oscillator (LO) 128 configured to generate a transmit LO (TxLO) signal to be supplied to multipliers 132. The multiplier 132a multiplies an I component by the TxLO signal, and multiplier 132b multiplies a Q component by the TxLO signal shifted by 90 degrees by a phase shifter 136. Respective outputs of the multipliers 132 are filtered by respective filters 140 and summed by an adder 144. An output of the adder 144 is provided to the AFE 108. In various embodiments, the RF device 109 and the AFE 108 include various analog circuitry (not shown) such as one or more of i) a digital to analog converter (DAC), ii) filters, iii) amplifiers, etc.

The receiver device 104 includes a RF receiver device 150 coupled to an AFE 152. The AFE 152 is coupled to a signal processor 156 via a mixer 160. In various embodiments, the RF device 150 and the AFE 152 include various analog circuitry (not shown) such as one or more of i) an analog to digital converter (ADC), ii) filters, iii) amplifiers, etc.

The mixer 160 includes a splitter 164 that splits a signal from the AFE 152. An LO 168 is configured to generate a receive LO (RxLO) signal to be supplied to multipliers 172. The multiplier 172a multiplies a first output of the splitter 164 by the RxLO signal, and multiplier 172b multiplies a second output of the splitter 164 by the RxLO signal shifted by 90 degrees by a phase shifter 176. Respective outputs of the multipliers 172 are filtered by respective filters 180 to generate I and Q components. Outputs of the filters 186 are provided to the signal processor 156.

In an embodiment, the AFE 152 includes another mixer (not shown) that down-converts an RF signal to an IF signal, and the mixer 160 down-converts IF signal to generate I and Q components of a baseband signal. In another embodiment, the mixer 160 directly down-converts the RF signal to the I and Q components of the baseband signal.

The signal processor 156 includes an I path and a Q path. Additionally, the signal processor 156 includes an RX I/Q compensation device 182, a frequency offset correction device 184, and a fast Fourier transform (FFT) calculator 186.

In an embodiment, IQ phase and/or amplitude imbalance is introduced into a signal to be transmitted by one or more components in the transmitter device 102. Similarly, IQ phase and/or amplitude imbalance is introduced into a received signal by one or more components in the receiver device 104. Similarly, IQ phase and/or amplitude imbalance is introduced into a received signal by one or more components in the receiver device 104. IQ phase and/or amplitude imbalance can reduce performance, at least in some embodiments and/or scenarios. For example, IQ mismatch introduced into a signal to be transmitted can cause an image of the signal to be transmitted along with signal itself.

Figure 2:
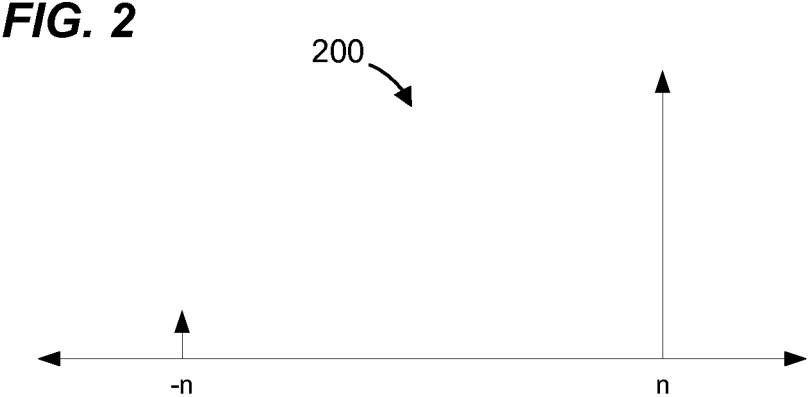
FIG. 2 is a diagram showing a frequency representation of components of an OFDM signal including a signal component and an image of the signal component caused by an IQ imbalance in a transmitter, according to an embodiment.

As an illustrative example, FIG. 2 shows a frequency representation 200 of components of an OFDM signal generated by the transmitter device 102. The signal includes a component at subcarrier index n, where n is a positive integer. The signal also includes an image of the n-th subcarrier component at a subcarrier index −n. The image component at −n is caused by an IQ imbalance introduced in the transmitter device 102.

In at least some embodiments and/or scenarios, at least some of the IQ phase and/or amplitude imbalances are frequency dependent. For example, analog components in the AFE 108, the RF device 109, the RF device 150, and/or the AFE 152 (e.g., amplifiers, filters, etc.) have frequency dependent gains and/or frequency dependent path delays, in some embodiments and/or scenarios.

Referring again to FIG. 1, the communication device 100 is configured to measure and compensate for IQ phase and/or amplitude imbalances, in an embodiment. For example, the communication device 100 includes a test signal generator 188, an RF loop back path 190, a test signal capture device 192, and a Tx/Rx I/Q imbalance estimation device 194 for use in measuring IQ phase, amplitude, and/or path delay imbalances, according to an embodiment, as will be discussed in more detail below. In an embodiment, the loop back path 190 is incorporated in the RF device 109 and the RF device 150. For example, in an embodiment, the loop back path 190 couples an antenna port of the RF device 109 to an antenna port of the RF device 150.

A control processor 198 is configured to control the communication device 100 to perform measurement and calibration procedures for measuring and compensating for IQ phase, amplitude and/or phase delay imbalances, according to an embodiment, as will be discussed in more detail below. In an embodiment, the control processor 198 is configured to execute machine readable instructions stored in a memory device (not shown) coupled to or included in the control processor 198. In another embodiment, the control processor 198 comprises a hardware device that does not execute machine readable instructions stored in a memory device. In some embodiments, control processor 198 implements all of, or a respective portion of, one or more of the Tx/Rx I/Q imbalance estimation device 194 or the test signal generator 188.

The Tx I/Q pre-compensation device 106 is configured according to compensation values determined as a result of procedures for measuring and compensating for IQ phase, amplitude, and/or path delay to compensate for IQ phase, amplitude, and/or path delay imbalances in the transmitter device 102. For example, the Tx I/Q pre-compensation device 106 is configured to introduce a suitable phase shift, a suitable magnitude adjustment, and/or a suitable path delay into one or both of the I path and the Q path, in an embodiment. Similarly, the Rx I/Q pre-compensation device 182 is configured according to compensation values determined as a result of procedures for measuring and compensating for phase, amplitude, and/or path delay imbalances to compensate for IQ phase, gain, and/or path delay imbalances in the receiver device 104. For example, the Rx I/Q pre-compensation device 182 is configured to introduce a suitable phase shift, a suitable magnitude adjustment, and/or a suitable path delay into one or both of the I path and the Q path, in an embodiment.

Figure 3:
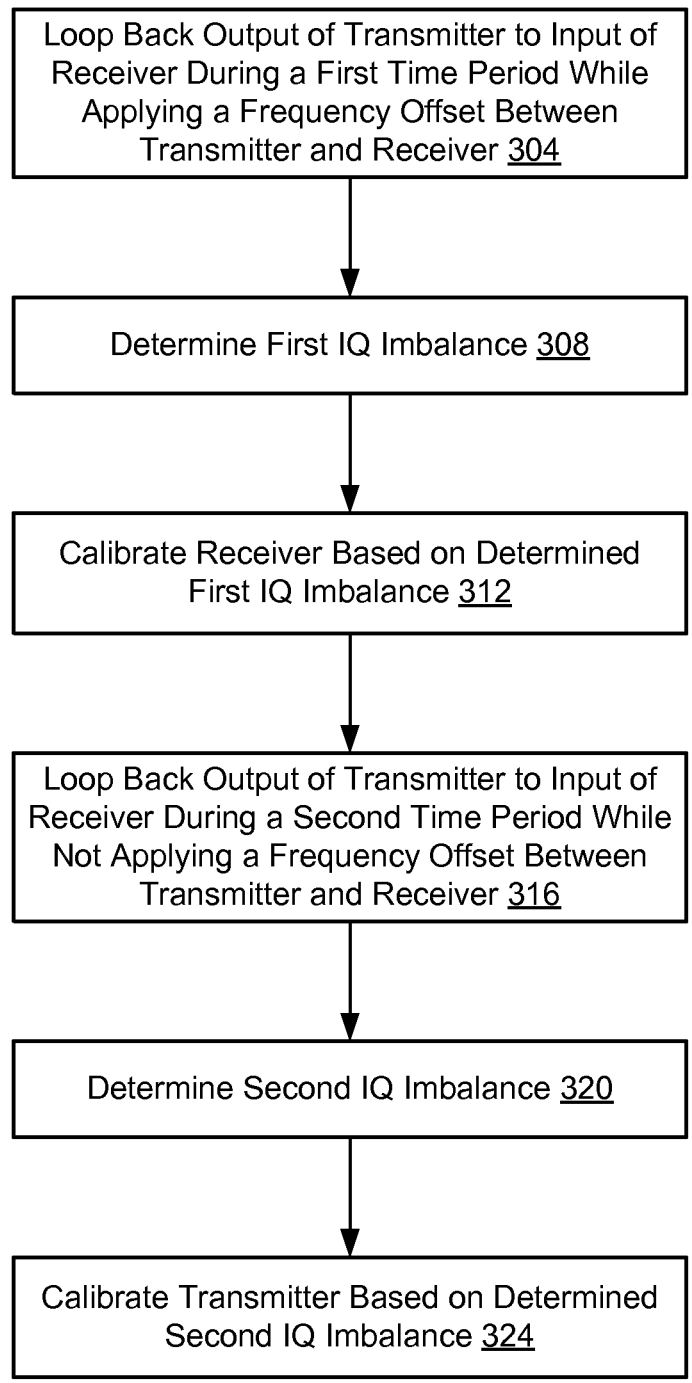
FIG. 3 is a flow diagram of an example method for calibrating for IQ imbalances in a transmitter and a receiver, according to an embodiment.

FIG. 3 is a flow diagram of an example method 300 that is implemented by the communication device 100, in an embodiment, and FIG. 3 is described with reference to FIG. 1 for illustrative purposes. In other embodiments, the method 300 is implemented by other suitable devices different than the communication device 100. Similarly, in some embodiments, the communication device 100 is configured to implement suitable methods different than the method 300.

At block 304, an output of a transmitter is looped back to an input of a receiver during a first time period while a frequency offset is applied between the transmitter and the receiver. For example, an output of the transmitter device 102 is looped back to an input of the receiver device 104 via the loop back path 190. In an embodiment, the loop back path 190 selectively couples the output of the transmitter device 102 to the input of the receiver device 104 under control of the control processor 198. Thus, in an embodiment, the control processor 198 controls the loop back path 190 to couple the output of the transmitter device 102 to the input of the receiver device 104 during the first time period.

In an embodiment, block 304 includes generating a test signal and providing the test signal as an input to the transmitter. For example, in an embodiment, the control processor 198 causes the test signal generator 188 to generate a test signal output. Additionally, the control processor 198 controls the Tx I/Q pre-compensation device 106 to select the output of the test signal generator 188 as an input signal to the transmitter device 102. The transmitter device 102 then up-converts the test signal to RF, and the up-converted test signal is provided as an input to the receiver device 104 via the loop back path 190.

In an embodiment utilizing OFDM, the frequency offset between the transmitter and the receiver is equal to $m*\frac{1}{8}*BW$, where m is a suitable positive integer, and BW is a bandwidth of an operating signal to be received by the receiver. In such an embodiment, such an offset will result in an integer (m) sub-carrier shift between the transmitter and the receiver. In an embodiment, the control processor 198 controls the mixer 124 to induce the offset.

At block 308, a first IQ imbalance of the receiver is determined using a signal received based on the loop back process of block 304. In an embodiment in which the frequency offset between the transmitter and the receiver is equal to $m*\frac{1}{8}*BW$ and in which a test tone is transmitted on a sub-carrier n, where n is an integer, determining the first IQ imbalance comprises measuring, in a received tone at subcarrier n−m, a test tone transmitted in a subcarrier n during the first time period, and measuring, in a received tone −n+m, an image of the test tone transmitted in the subcarrier n during the first time period.

Figure 4:
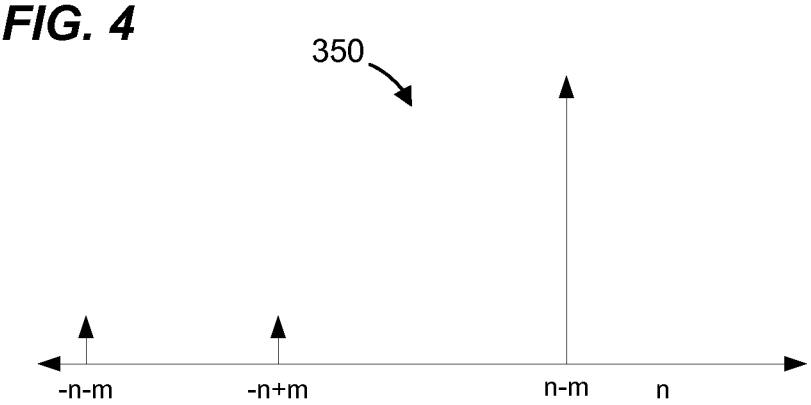
FIG. 4 is a diagram showing a frequency representation of components of an OFDM signal when transmitted by a transmitter at a frequency offset, where the OFDM signal includes a signal component, a first image of the signal component caused by an IQ imbalance in a receiver, and a second image component caused by an IQ imbalance in the transmitter, according to an embodiment.

As an illustrative example, FIG. 4 shows a frequency representation 350 of components of an OFDM signal received by the receiver device 104, in an embodiment. A test tone transmitted in subcarrier n is observed in the receiver at subcarrier n−m and an image due to Tx IQ imbalance from the calibration LO is observed in subcarrier −n−m. An image due to IQ imbalance in the receiver appears in subcarrier −n+m. Hence, using an output of the receiver FFT for subcarrier n−m and −n+m, measurements of the transmitted test tone and the image due to Rx IQ imbalance, respectively, are obtained.

Additionally, block 308 includes using at the least i) the measurement of the test tone at subcarrier n−m, and ii) the measurement of the image of the test tone at −n+m to determine the first imbalance, in an embodiment.

In an embodiment, the test signal capture device 192 measures a looped back test signal and provides measurements of the looped back test signal to the Tx/Rx I/Q imbalance estimate device 194. The Tx/Rx I/Q imbalance estimate device 194 then determines the first IQ imbalance based on the measurements of the looped back test signal, in an embodiment.

At block 312, the receiver is calibrated based on the determined first IQ imbalance. For example, the control processor 198 determines calibration information such as one or more of a suitable phase shift, a suitable magnitude adjustment, and/or a suitable path delay into one or both of the I path and the Q path of the receiver device and provides such calibration information to the Rx I/Q compensation device 182 to configure the Rx I/Q compensation device 182 to compensate for the determined first IQ imbalance.

At block 316, the output of the transmitter is looped back to the input of the receiver during a second time period while a frequency offset is not applied between the transmitter and the receiver. For example, the output of the transmitter device 102 is looped back to the input of the receiver device 104 via the loop back path 190 as in block 304. In an embodiment, the control processor 198 controls the loop back path 190 to couple the output of the transmitter device 102 to the input of the receiver device 104 during the second time period. In an embodiment, the control processor 198 controls the mixer 124 to utilize an LO frequency corresponding to normal operation.

In an embodiment, block 316 includes generating a test signal and providing the test signal as an input to the transmitter. For example, in an embodiment, the control processor 198 causes the test signal generator 188 to generate a test signal output. Additionally, the control processor 198 controls the Tx I/Q pre-compensation device 106 to select the output of the test signal generator 188 as an input signal to the transmitter device 102. The transmitter device 102 then up-converts the test signal to RF, and the up-converted test signal is provided as an input to the receiver device 104 via the loop back path 190.

At block 320, a second IQ imbalance of the transmitter is determined using a signal received based on the loop back process of block 316. In an embodiment in which a test tone is transmitted on a sub-carrier n, where n is an integer, determining the second IQ imbalance comprises measuring, in a received tone at subcarrier n, a test tone transmitted in a subcarrier n during the first time period, and measuring, in a received tone −n, an image of the test tone transmitted in the subcarrier n during the second time period, wherein the image is due to Tx IQ imbalance. For example, FIG. 2 illustrates an example of a test signal at subcarrier n and an image of the test signal at subcarrier −n, where the image is caused by Tx IQ imbalance. Additionally, block 320 includes using at the least i) the measurement of the test tone at subcarrier n, and ii) the measurement of the image of the test tone at −n to determine the second imbalance, in an embodiment.

In an embodiment, the test signal capture device 192 measures a looped back test signal and provides measurements of the looped back test signal to the Tx/Rx I/Q imbalance estimate device 194. The Tx/Rx I/Q imbalance estimate device 194 then determines the second IQ imbalance based on the measurements of the looped back test signal, in an embodiment.

At block 324, the transmitter is calibrated based on the determined second IQ imbalance. For example, the control processor 198 determines calibration information such as one or more of a suitable phase shift, a suitable magnitude adjustment, and/or a suitable path delay into one or both of the I path and the Q path of the 106 device and provides such calibration information to the Tx I/Q pre-compensation device 182 to configure the Tx I/Q pre-compensation device 106 to compensate for the determined second IQ imbalance.

The method 300 will now be discussed in further detail.

In an embodiment, a complex baseband representation of a test tone transmitted during the first time period (block 304) in subcarrier n observed at the receiver baseband with a channel effect $h_n$ can be represented as:

$$r_{bb,n}(t) = (K_2 K_4^*(n) + K_1 K_3(n)) h_n^* d_n^*(t) e^{-j\omega_n t} + (K_1 K_4(n) + K_2 K_3^*(n)) h_n d_n(t) e^{+j\omega_n t} \quad \text{Equ. 1}$$

where $$K_1 = \frac{1 + g e^{-j\phi}}{2},$$

$$K_2 = \frac{1 - g e^{+j\phi}}{2},$$

$$K_3(n) = \frac{1 - e^{-j\theta_n}}{2},$$

$$K_4(n) = \frac{1 + e^{j\theta_n}}{2},$$

$$\theta_n = \omega_n \tau,$$

$d_n(t)$ is the transmitted test tone data, g, is the gain imbalance in the receiver device 102, e.g., in the AFE 108 and RF 109, φ is the phase imbalance in the receiver device 102, e.g., in the AFE 108 and RF 109, and τ is the path delay imbalance in the receiver device 102, e.g., in the AFE 108 and RF 109.

Equation 1 can be represented in frequency domain as $$R_{bb}(f) = S_n + S_{-n} \quad \text{Equ. 2}$$

where $$S_{-n} = (K_2 K_4^*(n) + K_1 K_3(n)) H_n^* d_n^*$$

$$S_n = (K_1 K_4(n) + K_2 K_3^*(n)) H_n d_n$$

$S_{-n}$ is the image of the transmitted test tone in subcarrier -n, and $S_n$ is the transmitted tone in subcarrier n observed at the receiver, e.g., at an antenna port of the receiver.

As discussed above with reference to block 304 of FIG. 3, a frequency offset is induced in the transmitter LO, and the amount of the offset is an integer multiple (m) of ⅛ of an OFDM signal bandwidth, according to an embodiment. In such an embodiment, the frequency offset will result in the looped back signal, as seen at the receiver device 104, shifted by m sub-carriers as compared to the transmitted signal. In an embodiment, a frequency domain observation of the receiver IQ imbalance at the receiver baseband with m subcarrier shift is:

$$R_{bb}(f) = S_n + S_{-n} \quad \text{Equ. 3}$$

where $$S_{-n} = (K_2^* K_4^*(n) + K_1 K_3(n)) H_n d_n^*$$

$$S_n = (K_1 K_4(n) + K_2^* K_3^*(n)) H_n d_n$$

In an embodiment, a test tone transmitted by the transmitter device 102 in subcarrier n is now observed in the receiver device 104 at subcarrier n−m and the image due to Tx IQ imbalance from the calibration LO is observed in subcarrier −n−m. The image due to IQ imbalance in the receiver device 104 will appear in subcarrier −n+m. Hence, by measuring an output of the FFT calculator 186 of the receiver device 104 for subcarrier n−m and −n+m, the transmitted test tone and the image due to Rx IQ imbalance, respectively, are obtained. The measured information is used by the Tx/Rx I/Q Imbalance Estimation 194 to compute the Rx IQ imbalance, in an embodiment.

With regard to block 316 of FIG. 3, the receiver baseband complex representation of a received test tone signal during the second time period with transmit IQ imbalance can be represented as:

$$r_{bb,n}(t) = (K_2^* K_4^*(n) + K_1 K_3(n)) h_n d_n^*(t) e^{-j\omega_n t} + (K_1 K_4(n) + K_2^* K_3^*(n)) h_n d_n(t) e^{+j\omega_n t} \quad \text{Equ. 4}$$

where $$K_1 = \frac{1 + g e^{+j\phi}}{2},$$

$$K_2 = \frac{1 - g e^{-j\phi}}{2},$$

$$K_3(n) = \frac{1 - e^{-j\theta_n}}{2},$$

$$K_4(n) = \frac{1 + e^{j\theta_n}}{2},$$

$$\theta_n = \omega_n \tau.$$

Equation 4 can be represented in frequency domain as:

$$R_{bb}(f) = S_{-n-m} + S_{-n+m} \quad \text{Equ. 5}$$

where $$S_{-n+m} = (K_2 K_4^*(n-m) + K_1 K_3(n-m)) H_{n-m}^* d_n^*$$

$$S_{n-m} = (K_1 K_4(n-m) + K_2 K_3^*(n-m)) H_{n-m} d_n$$

Hence, by measuring an output of the FFT calculator 186 of the receiver device 104 for subcarrier n and −n, the transmitted test tone and the image due to Tx IQ imbalance, respectively, are obtained. The measured information is used by the Tx/Rx I/Q Imbalance Estimation 194 to compute the Tx IQ imbalance, in an embodiment.

Figure 5:
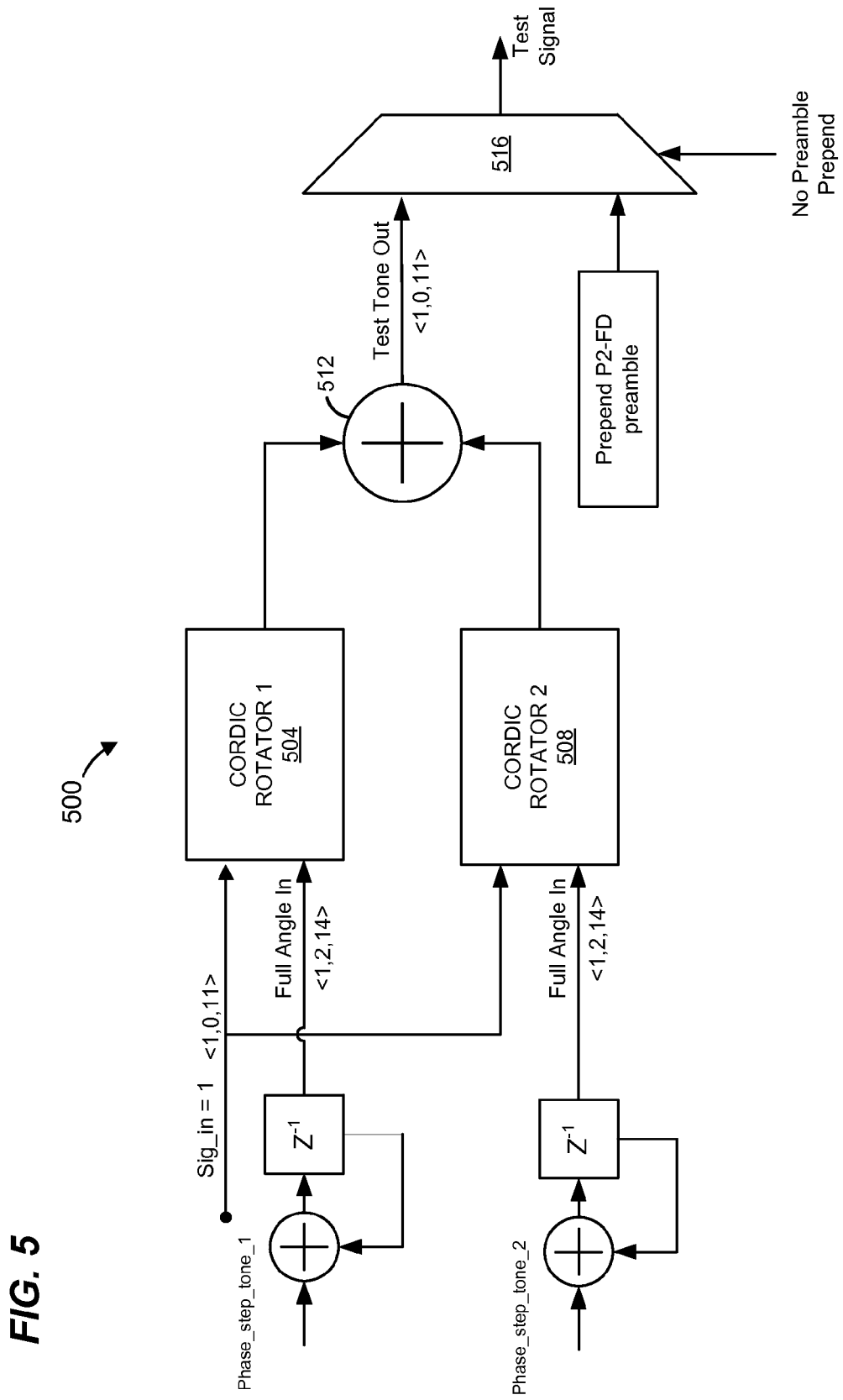
FIG. 5 is a block diagram of an example test signal generator that may be utilized in the communication device of FIG. 1, according to an embodiment.

FIG. 5 is a block diagram of an example test signal generator 500 that may be utilized in the communication device 100 of FIG. 1 as the test signal generator 188, in an embodiment. In other embodiments, other suitable test signal generators are utilized as the test signal generator 188.

A cordic rotator 504 generates a first complex tone signal, and a cordic rotator 508 generates a second complex tone signal. An adder 512 sums first complex tone signal and the second complex tone signal to generate a test tone output. The test tone output is provided to a first input of a multiplexer 516. A second input of the multiplexer receives a fixed preamble sequence. An output of the multiplexer 516 provides the test signal. In an embodiment and in some scenarios, the multiplexer 516 is controlled to generate the test signal such that the preamble is prepended to the test tone output. In other scenarios, the multiplexer 516 is controlled to generate the test signal such that the preamble is not prepended to the test tone output. For example, in an embodiment, the control processor 198 (FIG. 1) controls the multiplexer 516 to generate the test signal such that either i) the preamble is prepended to the test tone output, or ii) the preamble is not prepended to the test tone output.

In an embodiment, the test signal generator 500 can be configured to generate up to two complex tones simultaneously. For example, in an embodiment, the control processor 198 (FIG. 1) controls the multiplexer 516 to either i) generate the test signal to include only a single complex tone, or ii) generate the test signal to include two complex tones simultaneously.

Referring again to FIG. 1, in embodiments and/or scenarios in which no preamble being transmitted in the test signal, the control processor 198 or another suitable device facilitates synchronization of the transmitter device 102 and the receiver device 104 so that the looped back test signal can be properly processed by the FFT calculator 186. In an embodiment, the control processor 198 or another suitable device causes digital gain and analog gain settings in the transmitter device 102 and the receiver device 104 to suitable values during the loop back processes. In some embodiments and/or some scenarios, preamble detection is replaced with a control signal to indicate a start of a test signal measurement. In an embodiment, the control processor 198 or another suitable device causes time domain carrier frequency offset (CFO) corrections to be bypassed during test signal transmission and reception. In an embodiment, the control processor 198 or another suitable device causes sampling frequency offset (SFO) corrections to be bypassed during test signal transmission and reception.

Figure 6:
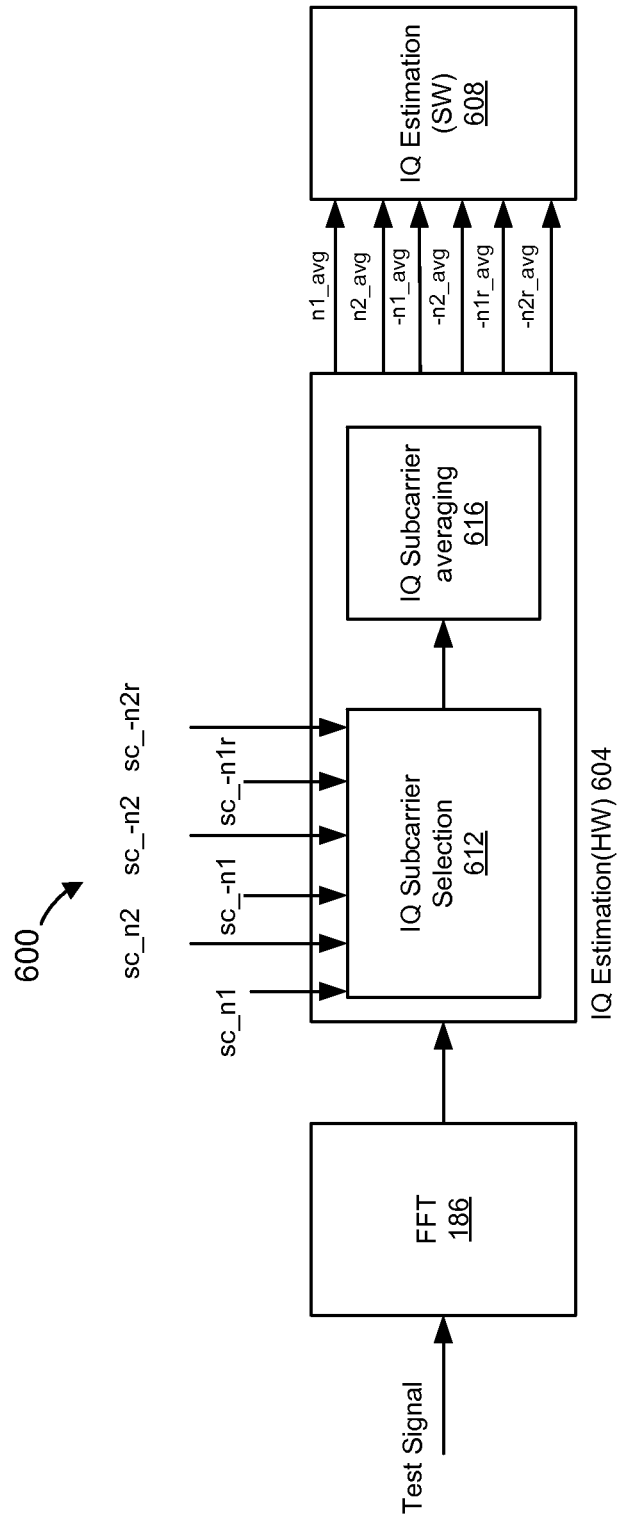
FIG. 6 is a block diagram of an example Tx/Rx I/Q imbalance estimation device that may be utilized in the communication device of FIG. 1, according to an embodiment.

FIG. 6 is a block diagram of an example Tx/Rx I/Q imbalance estimation device 600 that may be utilized in the communication device 100 of FIG. 1 as the Tx/Rx I/Q imbalance estimation device 194, in an embodiment. In other embodiments, other suitable Tx/Rx I/Q imbalance estimation devices are utilized as the Tx/Rx I/Q imbalance estimation device 194.

In an embodiment, the Tx/Rx I/Q imbalance estimation device 600 includes a hardware portion 604 and a software portion 608 (i.e., implemented by a processor executing machine readable instructions stored in a memory device). In other embodiments, the Tx/Rx I/Q imbalance estimation device 600 is implemented entirely in hardware that does not execute machine readable instructions stored in a memory device, or entirely in a processor that executes machine readable instructions stored in a memory device. In an embodiment, the software portion 608 is implemented by the control processor 198 (FIG. 1). In another embodiment, the software portion 608 is implemented by another processor (no shown in FIG. 1) separate from the control processor 198.

The hardware portion 604 includes a selection block 612 configured to select appropriate subcarriers, indicated by information stored in one or more memory devices (e.g., registers) sc_n1, sc_n2, sc_−n1, sc_−n2, sc_−n1r and sc_−n2r (for an embodiment in which the test signal includes two test signal tones). The selected subcarriers correspond to subcarriers having test signal tones and images of the test signal tones. In an embodiment, for Rx IQ imbalance calibration in which there is a frequency offset between the Rx signal LO and the Tx calibration LO as discussed above, there are four image tones. An averaging block 616 is configured to sum the FFT output of each selected subcarrier is over a suitable duration, e.g., a duration of test signal tones. The result of the summation is sent to a processor (block 608) for IQ imbalance estimation.

Figure 7:
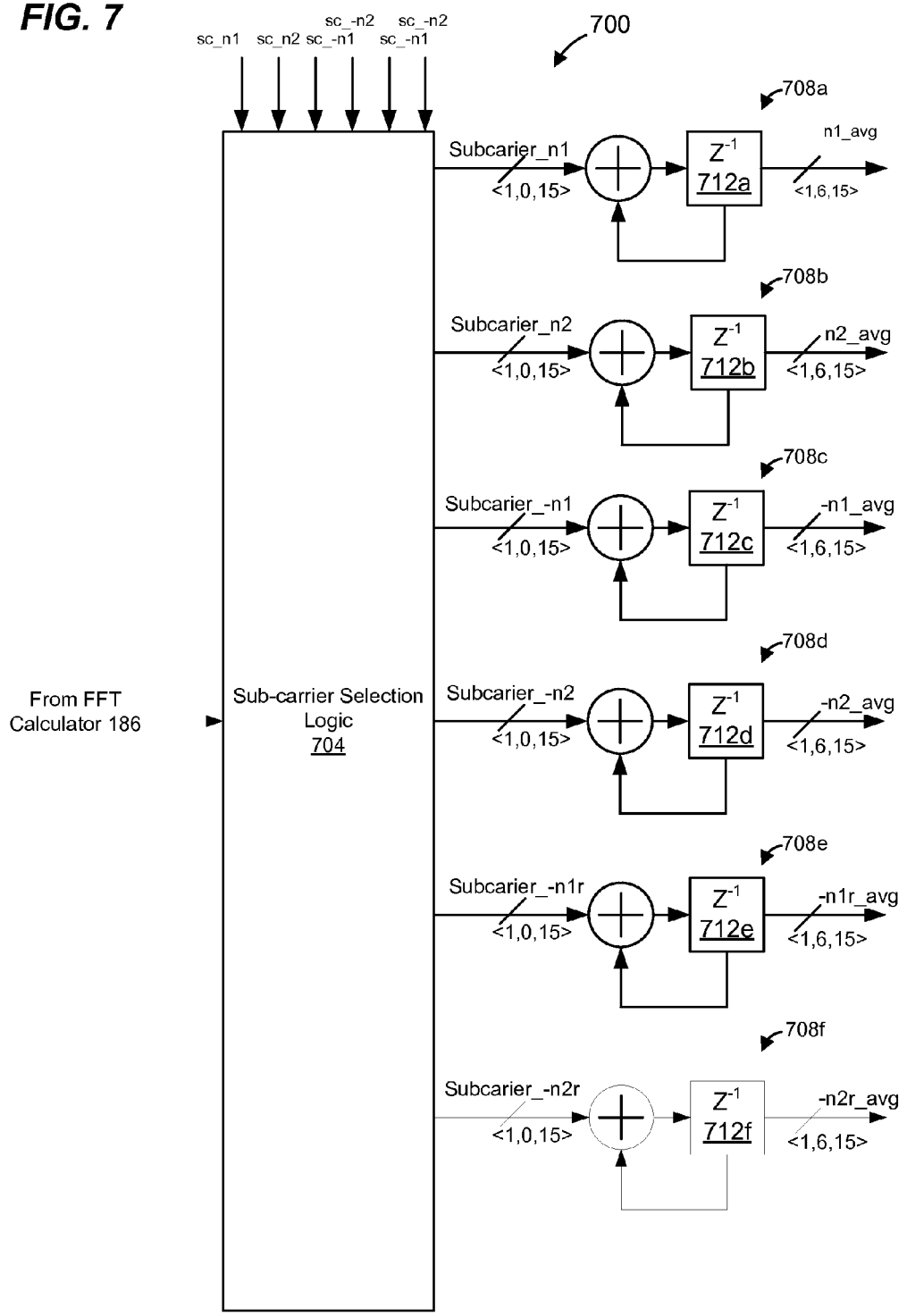
FIG. 7 is a block diagram of an example Tx/Rx I/Q imbalance estimation calculator that may be utilized in the communication device of FIG. 1, according to an embodiment.

FIG. 7 is a block diagram of an example Tx/Rx I/Q imbalance estimation calculator 700 that may be utilized in the Tx/Rx I/Q imbalance estimation device 600 of FIG. 6 as the hardware portion 604, in an embodiment. In other embodiments, other suitable Tx/Rx I/Q imbalance estimation calculators are utilized as the hardware portion 604.

Selection logic 704 is configured to select Subcarrier_n1, Subcarrier_n2, Subcarrier_−n1, Subcarrier_−n2, Subcarrier_−n1r, and Subcarrier_−n2r from the output of the FFT calculator 186 according to register values sc_n1, sc_n2, sc_−n1, sc_−n2, sc_−n1r, and sc_−n2r, respectively, which indicate respective subcarrier indices, in an embodiment. In an embodiment, the calculator 704 receives one new respective complex value from the FFT calculator 186 for each selected sub-carrier per OFDM symbol duration. Thus, in an embodiment, a test signal payload of N OFDM symbols (where N is a suitable positive integer) will have N complex values per subcarrier. A plurality of summing devices 708 are configured to sum the N complex values over the duration of the payload. Each summing device 708 includes a respective register 712 (or another, or portion of another, suitable memory device). At the end of the summing process which corresponds to the end of the test signal payload, in an embodiment, the respective register 712 will hold a summed value of a selected respective sub-carrier. In an embodiment, a processor (e.g., the control processor 198 or another suitable processor) reads the summed values from the registers 712 at the end of the end of the summing process. The output of the registers 712 are denoted by n1_avg, n2_avg, −n1_avg, −n2_avg, −n1r_avg, and −n2r_avg. The registers 712 can be collectively referred as an IQ estimate registers set.

Figure 8:
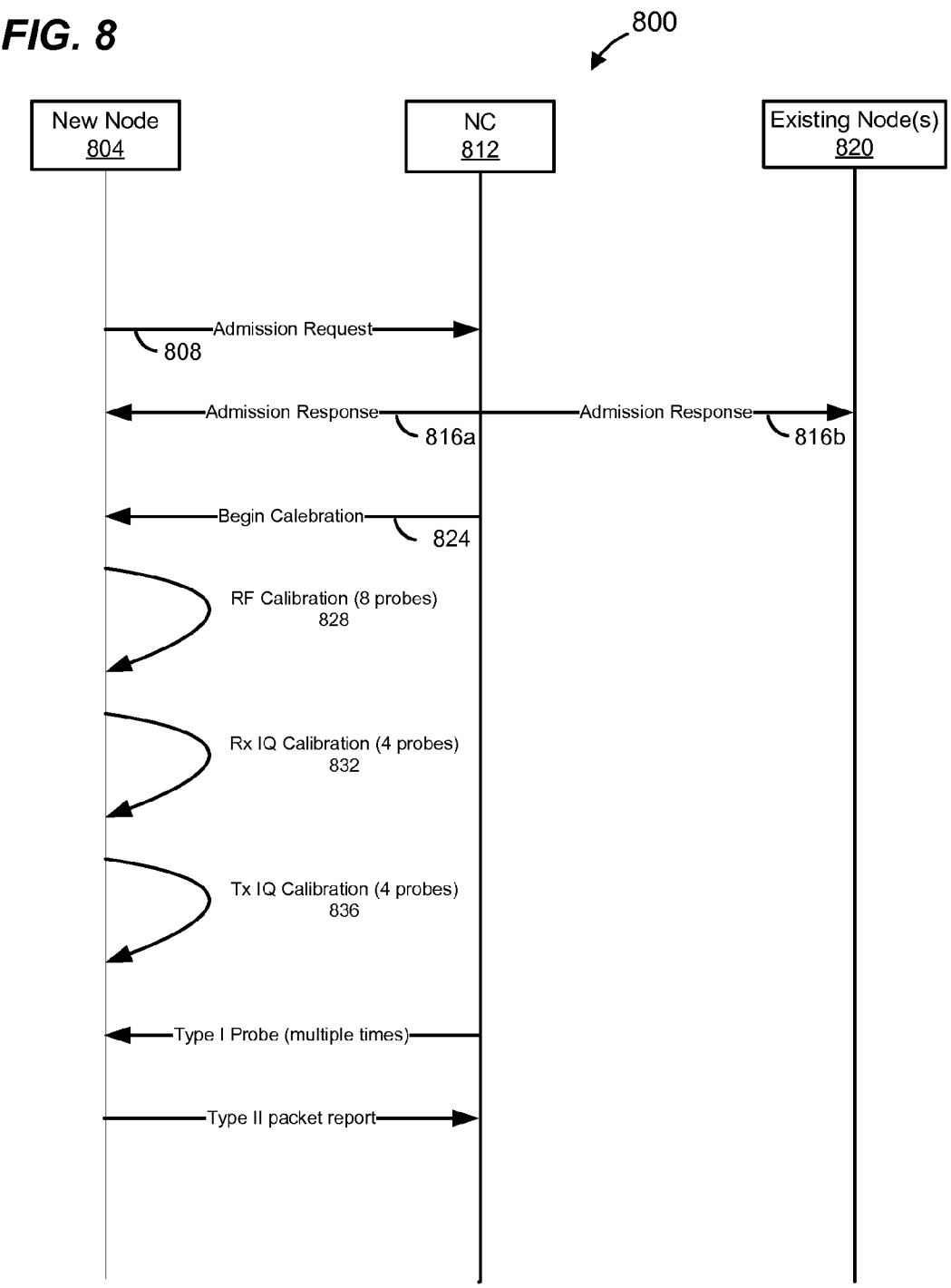
FIG. 8 is a timing diagram of an example procedure for performing Tx/Rx I/Q imbalance estimation and calibration that may be utilized by the communication device of FIG. 1, according to an embodiment.

FIG. 8 is a timing diagram of an example procedure 800 for performing Tx/Rx I/Q imbalance estimation and calibration in a MoCA 1.0, 1.1, and/or 2.0 environment, for example, and that may be utilized by the communication device 100 of FIG. 1, in an embodiment. In other embodiments, other suitable procedures are utilized by the communication device 100.

FIG. 8 corresponds to an example IQ imbalance calibration process performed during a Network Admission and Link Maintenance Operation. The calibration procedure 800 involves multiple loopback test signal transmissions over multiple beacon sync intervals using Type B probe transmission bandwidth allocation, where Type B probes are defined in the MoCA 1.0 and/or 1.1 specifications. Additionally, a maximum number of Type B probes is defined in the MoCA 1.0 and/or 1.1 specifications as the constant N15 (N15=16). In some embodiments, Type A probes (defined in the MoCA 1.0 and/or 1.1 specifications) are utilized, such as when the maximum number of Type B probes is met. In another embodiment, receiver IQ imbalance calibration may be performed using Type II probes (defined in the MoCA 1.0 and/or 1.1 specifications) such as when it is known that the transmitting device has a negligible IQ imbalance.

A new node 804 in a MoCA network sends an admission request signal 808 to a network coordinator (NC) 812. The new node 804 includes the communication device 100, in an embodiment, or another suitable communication device. In response to the admission request signal 808, the NC 812 sends an admission response signal 816 to the new node 804 and any existing nodes 820 (if any).

The NC 812 next sends a signal 824 to the new node 804, where the signal 824 indicates that the new node 804 should begin a calibration procedure. In response to receiving the signal 824, the new node 804 begins a calibration procedure such as discussed above.

In an embodiment, the calibration procedure includes a suitable RF calibration portion 828 that involves the new node 804 looping back eight (or another suitable number) of Type B probes (e.g., test signals). During an Rx IQ imbalance calibration portion 832, the new node 804 loops back four (or another suitable number) of Type B probes (e.g., test signals). During a Tx IQ imbalance calibration portion 836, the new node 804 loops back four (or another suitable number) of Type B probes (e.g., test signals).

In an embodiment, the NC 812 allocates the type B probes in calibration portions 828, 832, and 836 as part of a network admission protocol. In an embodiment, the new node 804 decodes probe allocation information received from the NC 812, and the communication device 100 sets up the transmitter 102 and the receiver 104 to transmit and receive a loop back test tone probes for each type B probe allocation.

In an embodiment, the procedure 800 includes four Rx IQ imbalance estimation attempts (attempt #1, attempt #2, attempt #3, attempt #4) during network admission, as shown in Table 1 below. In an embodiment, the following steps during the calibration portion 832:

Step 1: The transmitter 102 is set up to transmit 1 loopback test tone probe according to the type B probe allocation scheduled by the NC 812 (e.g., according to the MoCA 1.0 and/or 1.1 specifications for the probe allocation). The test signal generator 188 is set up to generate a test tone probe of iq_probe_sym OFDM symbol with phase_step_tone 1 set to the frequency of subcarrier n1 and phase_step_tone 2 set to the frequency of subcarrier n2. Additionally, the communication device 100 is configured in RF loopback mode, the transmitter 102 is configured to use the calibration LO with a frequency offset K_CAL (see Table 1), and the receiver 104 is configured to use the signal LO (attempt #1). Additionally, the receiver IQ estimate register set is configured to indicate the appropriate subcarrier numbers of the test tones and their images.

The value of phase_step_tone1 is set to subcarrier index for tone 1 (sc_n1)/fft_size*2*π.

The value of phase_step_tone2 is set to subcarrier index for tone 2 (sc_n2)/fft_size*2*π.

Step 2: Transmit and measure the loopback test tone probe setup in step 1 during the type B probe allocation scheduled by the NC 812.

Step 3: Repeat Step 1 and 2 with setting for attempt #2 and process the captured IQ imbalance measurements according to a suitable algorithm to generate an Rx IQ imbalance compensation setting.

Step 4: Repeat step 1, step 2 and step 3 for attempts #3 and #4, compensating the Rx IQ imbalance of the received test tone signal by configuring the RX IQ imbalance compensation device 182 with the calculated RX IQ imbalance compensation setting from step 3. The IQ imbalance estimates are recalculated according to a suitable algorithm. The RX IQ compensation setting is recalculated with the recomputed RX IQ imbalance estimates. Future test signal transmissions, data transmissions, and control packet transmissions and receptions then use the new compensation settings calculated at step 4.

In an embodiment, the procedure 800 includes four Tx IQ imbalance estimation attempts (attempt #1, attempt #2, attempt #3, attempt #4) during network admission, as shown in Table 1 below. In an embodiment, the following steps during the calibration portion 836:

Step 1: The transmitter 102 is set up to transmit a loopback test tone probe according to the Type B probe allocation scheduled by the NC 812. The test signal generator 188 is set up to generate a test tone probe of iq_probe_sym OFDM symbol with phase_step_tone 1 set to the frequency of subcarrier n1 and phase_step_tone 2 set to the frequency of subcarrier n2. Additionally, the communication device 100 is configured in loopback, the transmitter 102 is configured to use the signal LO, and the receiver 104 is configured to use the signal LO. The IQ imbalance estimate register set is set up to indicate the subcarrier numbers of the test tones and their images.

The value of phase_step_tone1d is set to subcarrier index for tone 1 (sc_n1)/fft_size*2*π.

The value of phase_step_tone2 is set to subcarrier index for tone 2 (sc_n2)/fft_size*2*π.

Step 2: The loopback test tone probe setup in step 1 is transmitted and measured during the scheduled type B probe allocation. (Attempt #1)

Step 3: Repeat step 1 and step 2 using setting for attempt #2 and process the measured IQ imbalance estimate register set for attempt #1 and attempt #2 according to a suitable algorithm to generate Tx IQ imbalance pre-compensation settings.

Step 4: The Tx IQ pre-compensation device 106 is configured with the determined Tx IQ pre-compensation settings. Repeat steps 1, 2 and 3 for attempt #3 and attempt #4.

Step 5: New values of the TX IQ imbalance pre-compensation settings are calculated using the measurements made in step 4. Future test signal transmissions, data transmissions, and control packet transmissions and receptions then use the new compensation settings calculated at step 4.

TABLE 1

Illustrative example Calibration parameter settings for each calibration step (MoCA 1.0 and/or 1.1), according to an embodiment

| Attempt # | 1 | 2 | 3 | 4 |
|---|---|---|---|---|
| Step 1,2, and 3 (Rx IQ estimation) | Iq_probe_sym = 30<br>n1 = 36<br>n2 = 80<br>K_CAL = −6.25 MHz<br>Sc_n1 = 4<br>Sc_n2 = 48<br>Sc_−n1 = −68<br>Sc_−n2 = −112<br>SC_−n1r = −4<br>Sc_−n2r = −48<br>CP = 64 | Iq_probe_sym = 30<br>n1 = −36<br>n2 = −80<br>K_CAL = 6.25 MHz<br>Sc_n1 = −4<br>Sc_n2 = −48<br>Sc_−n1 = 68<br>Sc_−n2 = 112<br>SC_−n1r = 4<br>Sc_−n2r = 48<br>CP = 64 | Iq_probe_sym = 30<br>n1 = 36<br>n2 = 80<br>K_CAL = −6.25 MHz<br>Sc_n1 = 4<br>Sc_n2 = 48<br>Sc_−n1 = −68<br>Sc_−n2 = −112<br>SC_−n1r = −4<br>Sc_−n2r = −48<br>CP = 64 | Iq_probe_sym = 30<br>n1 = −36<br>n2 = −80<br>K_CAL = 6.25 MHz<br>Sc_n1 = −4<br>Sc_n2 = −48<br>Sc_−n1 = 68<br>Sc_−n2 = 112<br>SC_−n1r = 4<br>Sc_−n2r = 48<br>CP = 64 |

TABLE 1-continued

Illustrative example Calibration parameter settings for each
calibration step (MoCA 1.0 and/or 1.1), according to an embodiment

| Attempt # | 1 | 2 | 3 | 4 |
|---|---|---|---|---|
| Step 1,2, and 3 (Tx IQ estimation) | Iq_probe_sym = 30<br>n1 = 4<br>n2 = 48<br>K_CAL = 0 MHz<br>Sc_n1 = 4<br>Sc_n2 = 48<br>Sc_-n1 = -4<br>Sc_-n2 = -48<br>CP = 64 | Iq_probe_sym = 30<br>n1 = -4<br>n2 = -48<br>K_CAL = 0 MHz<br>Sc_n1 = -4<br>Sc_n2 = -48<br>Sc_-n1 = 4<br>Sc_-n2 = 48<br>CP = 64 | Iq_probe_sym = 30<br>n1 = 4<br>n2 = 48<br>K_CAL = 0 MHz<br>Sc_n1 = 4<br>Sc_n2 = 48<br>Sc_-n1 = -4<br>Sc_-n2 = -48<br>CP = 64 | Iq_probe_sym = 30<br>n1 = -4<br>n2 = -48<br>K_CAL = 0 MHz<br>Sc_n1 = -4<br>Sc_n2 = -48<br>Sc_-n1 = 4<br>Sc_-n2 = 48<br>CP = 64 |

In some embodiments, Tx and/or Rx IQ imbalance compensation may be fine-tuned using procedures similar to those discussed above, such as during a link maintenance operation.

An illustrative example of a suitable Rx IQ imbalance estimation algorithm for uses with the procedure 800, according to an embodiment, is now described. In other embodiments, other suitable Rx IQ imbalance estimation algorithms are utilized.

TABLE 2

Results of Rx IQ imbalance measurements

| Result from test tone probe #1 (or #3) | Result from test tone probe #2 (or #4) |
|---|---|
| $S_{n1\_1}^+$ = n1_avg | $S_{n1\_2}^+$ = n1_avg |
| $S_{n1\_1}^-$ = -n1_avg | $S_{n1\_2}^-$ = -n1_avg |
| $S_{n2\_1}^+$ = n2_avg | $S_{n2\_2}^+$ = n2_avg |
| $S_{n2\_1}^-$ = -n2_avg | $S_{n2\_2}^-$ = -n2_avg |
| $S_{n1\_1r}^-$ = n2_avg | $S_{n1\_2r}^-$ = n2_avg |
| $S_{n2\_1r}^-$ = -n2r_avg | $S_{n2\_2r}^-$ = -n2r_avg |

$S_{n1\_1r}^-$ and $S_{n2\_1r}^-$ are the average complex values of the image of tone 1 and tone 2, respectively, due to RX IQ imbalance. It is assumed that sc_n1 and sc_n2 are related by the sc_n2=C·sc_n1, where C is a suitable integer.

For each loopback test tone probe capture:

Step 1: Compute Rx path delay imbalance, $\tau_{rx}$ for each loopback test tone probe measured during the calibration portion 832 using:

$$\theta_{n1\_1} \approx \frac{2\Im m\left(\frac{S_{n2\_1r}^-}{(S_{n2\_1}^+)^*} - \frac{S_{n1\_1r}^-}{(S_{n1\_1}^+)^*}\right)}{(C-1)}$$ Equ. 6

$$\theta_{n1\_2} \approx \frac{2\Im m\left(\frac{S_{n2\_2r}^-}{(S_{n2\_2}^+)^*} - \frac{S_{n1\_2r}^-}{(S_{n1\_2}^+)^*}\right)}{(C-1)}$$

$$\tau_{rx} = \frac{\theta_{n1\_1}}{2\omega_{n1\_1}} + \frac{\theta_{n1\_2}}{2\omega_{n1\_2}}$$

where $\omega_{n1\_1}$ is the angular frequency of subcarrier sc_n1 for the attempt#1 and $\omega_{n1\_2}$ is the angular frequency of subcarrier sc_n1 for the attempt #2.

The normalized path delay imbalance is, norm_tau$_{rx}$=$\tau_{rx}f_s$, where $f_s$ is a sampling frequency.

Step 2: The product $K_1K_2$ for Rx imbalance is calculated according to:

$$(K_2K_1)_A \approx \frac{C}{C-1}\left(\frac{S_{n1\_1r}^- S_{n1\_1}^+}{|S_{n1\_1r}^- + (S_{n1\_1r}^+)^*|^2} - \frac{1}{C}\left(\frac{S_{n2\_1r}^- S_{n2\_1}^+}{|S_{n2\_1r}^- + (S_{n2\_1r}^+)^*|^2}\right)\right)$$ Equ. 7

$$(K_2K_1)_B \approx \frac{C}{C-1}\left(\frac{S_{n1\_2r}^- S_{n1\_2}^+}{|S_{n1\_2r}^- + (S_{n1\_2r}^+)^*|^2} - \frac{1}{C}\left(\frac{S_{n2\_2r}^- S_{n2\_2}^+}{|S_{n2\_2r}^- + (S_{n2\_2r}^+)^*|^2}\right)\right)$$

and compute the gain imbalance g and phase imbalance φ, $$g_A = \sqrt{1 - 4\Re e\{(K_1K_2)_A\}}$$ Equ. 8

$$\phi_A = \sin^{-1}\left(-\frac{2}{g}\Im m\{(K_1K_2)_A\}\right)$$

$$g_B = \sqrt{1 - 4\Re e\{(K_1K_2)_B\}}$$

$$\phi_B = \sin^{-1}\left(-\frac{2}{g}\Im m\{(K_1K_2)_B\}\right)$$

$$g_{rx} = \frac{g_A + g_B}{2}$$

$$\phi_{rx} = \frac{\phi_A + \phi_B}{2}$$

The value of norm_tau$_{rx}$ is added to a fract_delay_offset register value of a Q path frequency domain (FD)-interpolator (not shown) in the receiver 104 according to an embodiment. The register value fract_delay_offset might be non-zero due to a prior IQ imbalance calibration and/or other adjustment required by SFO tracking, for example.

The $g_{rx}$ and φrx value are used to update g1$_{rx}$ and g2$_{rx}$ compensation settings of the Rx IQ imbalance compensation device 182.

An illustrative example of a suitable Tx IQ imbalance estimation algorithm for uses with the procedure 800, according to an embodiment, is now described. In other embodiments, other suitable Tx IQ imbalance estimation algorithms are utilized.

The TX IQ estimation algorithm uses a pair of test tone probe results for computation.

TABLE 3

Results of Tx IQ imbalance measurements

| Result from test tone probe #1 (or #3) | Result from test tone probe #2 (or #4) |
|---|---|
| $S_{n1\_1}^+$ = n1_avg | $S_{n1\_2}^+$ = n1_avg |
| $S_{n1\_1}^-$ = −n1_avg | $S_{n1\_2}^-$ = −n1_avg |
| $S_{n2\_1}^+$ = n2_avg | $S_{n2\_2}^+$ = n2_avg |
| $S_{n2\_1}^-$ = −n2_avg | $S_{n2\_2}^-$ = −n2_avg |

$S_{n1}^+$ and $S_{n2}^+$ are the average complex values of the transmitted tone 1 and 2 at the FFT output. $S_{n1}^-$, and $S_{n2}^-$ are the average complex values of the image of tone1 and tone 2 due to Tx IQ imbalance. It is assumed that sc_n1 and sc_n2 is related by the sc_n2=C·sc_n1.

For each pair of loopback test tone probe capture,
Step 1: Compute path delay imbalance according to:

$$\theta_{n1} \approx \frac{2\Im m\left(\frac{(S_{n2\_1}^-)^*}{(S_{n2\_2}^+)^*} - \frac{(S_{n1\_1}^-)^*}{(S_{n1\_2}^+)^*}\right)}{(C-1)} \quad \text{Equ. 9}$$

$$\tau = \frac{\theta_{n1}}{\omega_{n1}}$$

where $\omega_{N1}$ is the angular frequency of subcarrier sc_n1. The normalized path delay imbalance is $\text{norm\_tau}_{tx}=f_s$.

Step 2: Compute the product $K_1K_2$ according to:

$$K_2K_1 \approx \frac{C}{C-1}\left(\frac{(S_{n1\_1}^-)^*S_{n1\_2}^+}{|(S_{n1\_1}^+)^*+(S_{n1\_2}^+)^*|^2} - \frac{1}{C}\left(\frac{(S_{n2\_1}^-)^*S_{n2\_2}^+}{|(S_{n2\_1}^+)^*+(S_{n2\_2}^+)^*|^2}\right)\right) \quad \text{Equ. 10}$$

and compute the gain imbalance g and phase imbalance φ:

$$g_{tx} = \sqrt{1 - 4\Re e\{K_1K_2\}} \quad \text{Equ. 11}$$

$$\phi_{tx} = \sin^{-1}\left(\frac{2}{g}\Im m\{K_1K_2\}\right)$$

Step 3: Compute a second set of results using Equations 9-11 by replacing $S_{n1\_1}^-$ with $S_{n1\_2}^-$, $S_{n2\_1}^-$ with $S_{n2\_2}^-$, $S_{n1\_2}^+$ with $S_{n2\_2}^+$, and $S_{n2\_2}^+$ with $S_{n2\_1}^+$. Obtain an average for $\text{norm\_tau}_{tx}$, $g_{tx}$ and $\phi_{tx}$.

Step 4: Update $\text{norm\_tau}_{tx}$, $g_{tx}$ and $\phi_{tx}$ of the signal LO Tx IQ imbalance pre-compensation setting.

The value of $\text{norm\_tau}_{tx}$ is added to the fract_delay_offset register value of an I path FD-interpolator (not shown) in the transmitter, in an embodiment. The register value fract_delay_offset might be non-zero due to a prior IQ imbalance calibration, for example.

In an embodiment, the control processor 198 maintains one set (gain, phase and path delay) of Tx IQ imbalance pre-compensation settings for the signal LO. In an embodiment, the communication device includes three registers (or another suitable memory device or devices) g1, g2, and fract_delay_offset in or coupled to the Tx IQ imbalance pre-compensation device 106. In an embodiment, values in g1, g2, and fract_delay_offset are updated according to:

$$g1_{tx} = g1_{tx} * g_{tx} \cos\phi_{tx}$$

$$g2_{tx} = g2_{tx} + g_{tx} \sin\phi_{tx}$$

$$\text{fract\_delay\_offset}_{tx} = \text{fract\_delay\_offset}_{tx} + \text{norm\_tau}_{tx}$$

if fract_delay_offset$_{tx}$ tx_sig_comp_ctrl=1 else tx_sig_comp_ctrl=0 \quad Equ. 12 where the subscript tx refers to the TX IQ imbalance pre-compensation setting when the signal LO is used on the Tx RF. In an embodiment, settings for when the calibration LO is used are g1=1, g2=0, norm_tau=0, tx_cal_comp_ctrl=1.

In an embodiment, the control processor 198 maintains one set (gain, phase and path delay) of Rx IQ imbalance compensation settings for the signal LO. In an embodiment, the communication device includes three registers (or another suitable memory device or devices) g1, g2, and fract_delay_offset for the I path of the Rx IQ imbalance compensation device 182. In an embodiment, values in g1, g2, and fract_delay_offset are updated according to:

$$g1_{rx} = g1_{rx} * g_{rx} \cos\phi_{rx}$$

$$g2_{rx} = g2_{rx} + g_{rx} \sin\phi_{rx}$$

$$\text{fract\_delay\_offset}_{rx\_ipath} = \text{fract\_delay\_offset}_{rx\_ipath} + \text{norm\_tau}_{rx} \quad \text{Equ. 13}$$

where the subscript rx refers to the RX IQ compensation setting when the signal LO is used in the Rx.

Referring again to FIG. 5 values phase_step_tone_1 and phase_step_tone_2 are stored in registers programmable by the control processor 198, for example, to generate tones at a certain frequency X. In an embodiment, phase_step_tone_1 is calculated according to:

$$\text{phase\_step\_tone\_1} = \frac{2\pi X}{f_s} \quad \text{Equ. 14}$$

where fs is the sampling frequency. For MoCA 1.0 and 1.1, fs=50 MHz. For MoCA 2, fs=100 MHz.

In an embodiment, the IQ estimation test tone frequency is an integer multiple k of fs/N so that the generated tone is located at the center of an OFDM subcarrier k where −N/2≤k<N/2. N is a total number of OFDM subcarriers. For MoCA 1.0 and 1.1, N=256. For MoCA 2, N=512. Hence, $$X = \frac{kf_s}{N} \quad \text{Equ. 15}$$

The following approximation of functions used in IQ imbalance estimation calculations can be utilized in some embodiments.

√(1−x) can be approximated as:

$$\sqrt{1-x} = 1 - \frac{x}{2} - \frac{x^2}{8} - \frac{x^3}{16} - \frac{5x^4}{128} \quad \text{Equ. 16}$$

$\sin^{-1}$ can be approximated as:

$$\sin^{-1}x = \frac{\pi}{2} - (\sqrt{1-x})(a_0 + a_1 x + a_2 x^2 + a_3 x^3) \quad \text{Equ. 17}$$

$a_0 = 1.5707288$, $a_1 = -0.2121144$, $$a_2 = 0.0742610 \text{ and } a_3 = -0.0187293$$

Thus, in an embodiment, the IQ estimation calculations in Equations 8 and 11 become:

$$g_{tx} = \sqrt{1 - 4\Re e\{K_1 K_2\}} \quad \text{Equ. 18}$$

$$g_{tx} = \sqrt{1-x} \text{ where } x = 4\Re e\{K_1 K_2\}$$

$$\phi_{tx} = \sin^{-1}\left(-\frac{2}{g}\Im m\{K_1 K_2\}\right)$$

$$\phi_{tx} = \sin^{-1}(x) \text{ where } x = \frac{2}{g}\Im m\{K_1 K_2\}$$

Figure 9:
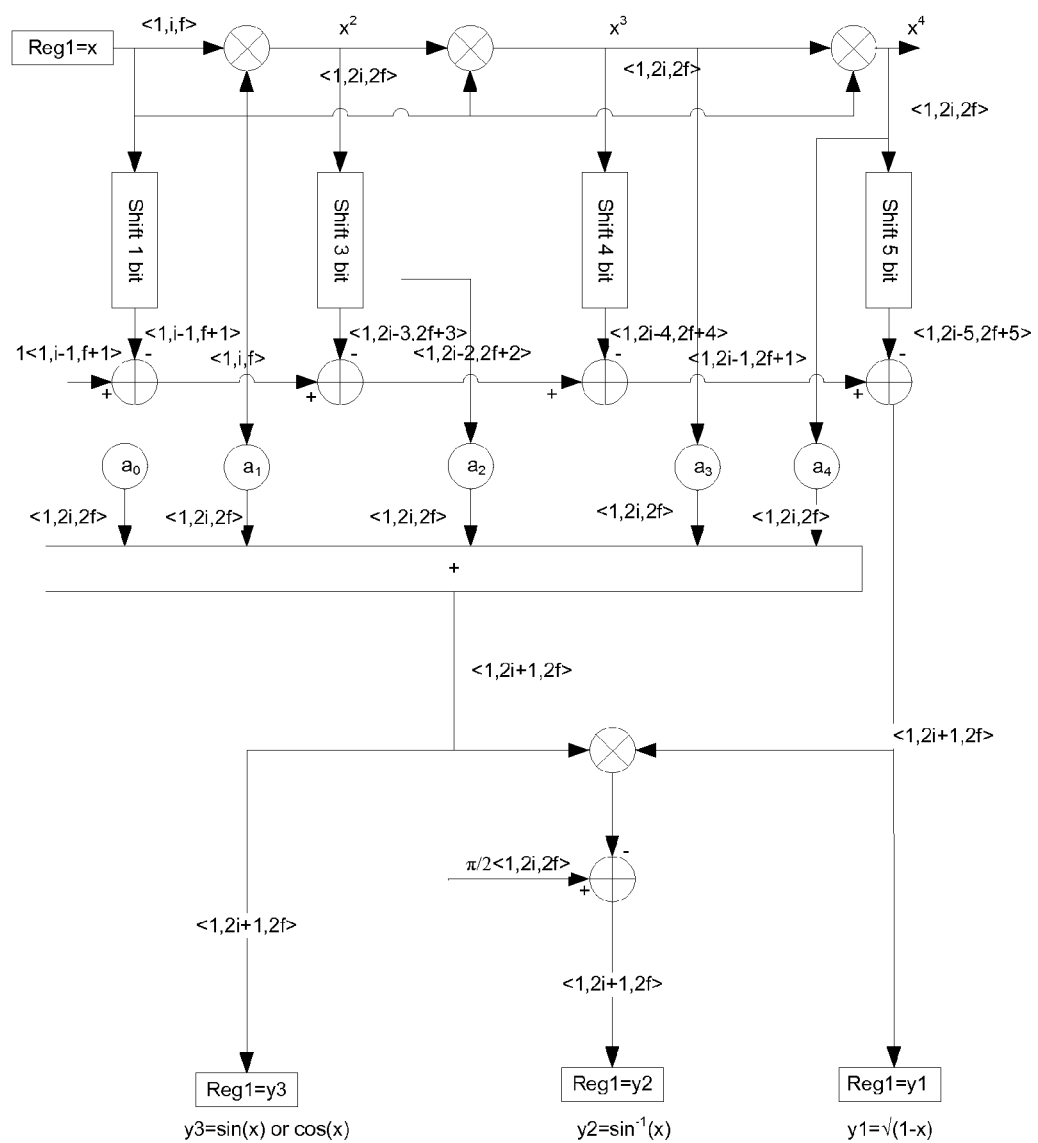
FIG. 9 is a block diagram of an example calculator that may be utilized in the communication device of FIG. 1, according to an embodiment

Equation 16 and 17 can be implemented in hardware such as shown in FIG. 9 using scalar multipliers and adders, according to an embodiment. In an embodiment, an input should have a bit format of <1,i,f> where the total bitwidth=1+i+f is 16 bits. The value of i and f is context dependent. The output bitwidth is 31 bits in the format <1,2i+1,2f>. The input and output may accessible by the control processor 198, for example, via registers. The start of the computation can be triggered in hardware when all the registers values are available. In an embodiment, an interrupt mechanism is utilized to indicate to software that the computation is completed.

TABLE 4

Coefficients for approximation

| Function | a0 | a1 | a2 | a3 | a4 |
|---|---|---|---|---|---|
| √(1-x) | 1.5707288 | −0.2121144 | 0.0742610 | −0.0187293 | 0 |
| sin⁻¹(x) | 1.5707288 | −0.2121144 | 0.0742610 | −0.0187293 | 0 |
| sin(x) | 0 | 1 | 0 | −1/6 | 0 |
| cos(x) | 1 | 0 | −1/2 | 0 | 1/24 |

As an illustrative example, pseudo code for performing Rx IQ imbalance and Tx IQ imbalance estimations, according to an embodiment. In other embodiments, other suitable techniques for performing Rx IQ imbalance and Tx IQ imbalance estimations are utilized.

TABLE 5

List of pseudo functions

| Pseudo Function | Description |
|---|---|
| write_iqprobe_pppm{reglist} = {variable_list} | Write the registers in reg_list in PPPM for iq probe with the values in variable_list |
| read_iqprobe_pppm{reg_list} = {variable_list} | Read the registers in reg_list in PPPM for iq probe and place the values in variable_list |
| write_registers{reg_list} = {variable_list} | Write the registers in reg_list with the values in the corresponding variables in variable_list |
| read_register{reg_list} = {variable_list} | Update the variables in variable_list with the values read from the registers in reg_list |
| hw_accel_ready | Hardware interrupt to indicate that acceleration function computation is ready |
| hw_accel_start | Indicate to hardware to start computation of acceleration function |
| setup_tx_to_send_packet{t} | Setup the tx to send packet at time t |
| setup_rx_to_receive_packet{t} | Setup the rx to receive packet at time t |
| obtain_start_time_of_packet_transmission{t} | Decode and process MAP/ACF to obtain packet transmission start time information and save it in variable t; |
| Iqprobe_rdy | Hardware indication that iqprobe is received |

TABLE 5-continued

List of pseudo functions

| Pseudo Function | Description |
|---|---|
| Set_rf_mode{a, f1, f2, c, t} | Set RFat time t to: 1) a = 1 => loopback, a = 0 => TDD 2) f1 = frequency of Tx LO 3) f2 = frequency of Rx LO 4) c = 1 => calibration LO on Tx, c = 0 => signal LO on Tx |
| Table(0|1, a) | Return the content of column number a of table 1, where a = 0 refers to attempt #1, for row 0 or 1 |
| Coeff(b) | Returns the coefficient a0 to a4 shown in table 2 where b is the row number |
| Intrp: | Some form of hardware interrupt handling |

Rx IQ Imbalance Estimation

PI=3.14159265;
fft_size=256 or 512;
f1=TBD;
Δ=TBD;
//write PPPM registers for IQ probe
Write_iqprobe_pppm{cyclic_prefix}={table(0,1).CP};
//perform rx IQ imbalance estimation
//initialization
rx_tau=0;
rx_g=0;
rx_phi=0;
for a=0:3
{
obtain_start_time_of_packet_transmission{t_type_B_probe(a+8)};//start on type B probe 8
//Step1: setup tx and rx
phase_step_tone_1_step_size=table1(0,a).n1/fft_size*2*PI;
phase_step_tone_2_step_size=table1(0,a).n2/fft_size*2*PI;
write_registers{phase_step_tone_1,phase_step_tone_2}
={phase_step_tone_1_step_size,
phase_step_tone_2_step_size};
write_registers{sc_n1,sc_n2,sc_−n1,sc_−n2,sc−n1r,sc−n2r}={table(0,a).sc_n1,  table(0,a).sc_n2,  fft_size+table(0,a).sc_−n1, fft_size+table(0,a).sc_−n2, fft_size+table(0,a).sc_−n1r, fft_size+table(0,a).sc_−n2r};
setup_tx_to_send_packet{t_type_B_probe(a+8)};
setup_rx_to_receive_packet{t_type_B_probe(a+8)};
set_rf_mode{1,f1,f1-table(0,a).K_CAL,1, t_type_B_probe(a+8)−Δ};
//software continues with other operations until interrupted by hardware
Intrp:Iqprobe_rdy;
read_register{n1_avg,n2_avg,−n1r_avg,−n2r_avg}
={splus_n1(a),splus_n2(a),sminus_n1r(a),sminus_n2r(a)};
//compute Rx IQ imbalance
C=(table(0,a).sc_n2)/(table(0,a).sc_n1);
rx_theta=2/(C−1)*imag((sminus_n2r(a)/conj(splus_n2(a)))−(sminus_n1r(a),/conj(splus_n1(a))))
rx_tau=rx_tau+rx_theta/(2π*table(0,a).sc_n1/fft_size)/2);
K1K2=C/(C−1)*((sminus_n1r(a)*splus_n1(a)/(abs(sminus_n1r(a)+conj(splus_n1(a)))^2))−(sminus_n2r(a)*splus_n2(a)/(abs(sminus_n2r(a)+conj(splus_n2(a)))^2))/C);
write_registers{x,a(0:4)}={4*real(K1K2),coeff(0)}
hw_accel_start;
Intrp:hw_accel_ready;
read_register{y1,y2}={tmp_g,dummy};

```
write_registers{x,a(0:4)}={-2/tmp_g*imag(K1K2),coeff
    (1)}
hw_accel_start;
Intrp:hw_accel_ready;
read_register{y1,y2}={dummy,tmp_phi};
rx_g=rx_g+tmp_g/2;
rx_phi=rx_phi+tmp_phi/2;
//update rx IQ compensation register
if (a==1||a==3)
    {
    write_registers{x,a(0:4)}={rx_phi,coeff(2)}
    hw_accel_start;
    Intrp:hw_accel_ready;
    read_register{y1,y2,y3}={dummy,dummy,sin_phi};
    write_registers{x,a(0:4)}={rx_phi,coeff(3)}
    hw_accel_start;
    Intrp:hw_accel_ready;
    read_register{y1,y2,y3}={dummy,dummy,cos_phi};
    g1=rx_g*cos_phi;
    g2=rx_g*sin_phi;
    read_register{rx_fract_delay_offset_path_i}={dd_i};
    write_register{g1_rx,g2_rx,
rx_fract_delay_offset_path_i}={g1,g2,dd_i+rx_tau};
    }
}//end for
```

Tx IQ Imbalance Estimation

```
//initialization
tx_tau=0;
tx_g=0;
tx_phi=0;
for a=0:3
{
obtain_start_time_of_packet_transmission{t_type_B_probe
    (a+12)};//start on type B probe 12
//Step1: setup tx and rx
phase_step_tone_1_step_size=table1(1,a).n1/fft_size*2*PI;
phase_step_tone_2_step_size=table1(1,a).n2/fft_size*2*PI;
write_registers{phase_step_tone_1,phase_step_tone_2}
    ={phase_step_tone_1_step_size,
    phase_step_tone_2_step_size};
write_registers{sc_n1,sc_n2,sc_-n1,sc_-n2}=
    {table(1,a).sc_n1, table(1,a).sc_n2,fft_size+table(1,a).sc_-
    n1, fft_size+table(1,a).sc_-n2, fft_size+table(1,a).sc_-n1r,
    fft_size+table(1,a).sc_-n2r};
setup_tx_to_send_packet{t_type_B_probe(a+12)};
setup_rx_to_receive_packet{t_type_B_probe(a+12)};
set_rf_mode{1,f1,f1,0, t_type_B_probe(a+8)-Δ};
//software continue with other operations until interrupted
    by HW
Intrp:Iqprobe_rdy;
read_register{n1_avg,n2_avg,-n1_avg,-n2_avg}
    ={splus_n1(a),splus_n2(a),sminus_n1(a),sminus_n2(a)};
//compute Rx IQ imbalance
if (a==1||a==3)
    {
    C=(table(1,a-1).sc_n2)/(table(1,a-1).sc_n1);
    tx_theta=2/(C-1)*imag((sminus_n2(a-1)/conj(splus_n2
    (a)))-(sminus_n1(a-1)/conj(splus_n1(a))))
    tx_tau=tx_tau+tx_theta/(2π*table(1,a-1).sc_n1/fft_size)/
    2);
    K1K2=C/(C-1)*((sminus_n1(a-1)*splus_n1(a)/(abs
    (sminus_n1(a-1)+conj(splus_n1(a)))^2))-(sminus_n2
    (a-1)*      splus_n2(a)/(abs(sminus_n2(a-1)+conj
    (splus_n2(a)))^2))/C);
    write_registers{x,a(0:4)}={4*real(K1K2),coeff(0)}
    hw_accel_start;
    Intrp:hw_accel_ready;
    read_register{y1,y2}={tmp_g,dummy};
    write_registers{x,a(0:4)}={-2/tmp_g*imag(K1K2),coeff
        (1)}
    hw_accel_start;
    Intrp:hw_accel_ready;
    read_register{y1,y2}={dummy,tmp_phi};
    tx_g=tx_g+tmp_g/2;
    tx_phi=tx_phi+tmp_phi/2;
    C=(table(1,a).sc_n2)/(table(1,a).sc_n1);
    tx_theta=2/(C-1)*imag((sminus_n2(a)/conj(splus_n2(a-
    1)))-(sminus_n1(a)/conj(splus_n1(a-1))))
    tx_tau=tx_tau+tx_theta/(2π*table(1,a).sc_n1/fft_size)/2);
    K1K2=C/(C-1)*((sminus_n1(a)*splus_n1(a-1)/(abs
    (sminus_n1(a)+conj(splus_n1(a-1)))^2))-(sminus_n2
    (a)*    splus_n2(a-1)/(abs(sminus_n2(a)+conj(splus_n2
    (a-1)))^2))/C);
    write_registers{x,a(0:4)}={4*real(K1K2),coeff(0)}
    hw_accel_start;
    Intrp:hw_accel_ready;
    read_register{y1,y2}={tmp_g,dummy};
    write_registers{x,a(0:4)}={-2/tmp_g*imag(K1K2),coeff
        (1)}
    hw_accel_start;
    Intrp:hw_accel_ready;
    read_register{y1,y2}={dummy,tmp_phi};
    tx_g=tx_g+tmp_g/2;
    tx_phi=tx_phi+tmp_phi/2;
    //update rx IQ compensation register
    write_registers{x,a(0:4)}={tx_phi,coeff(2)}
    hw_accel_start;
    Intrp:hw_accel_ready;
    read_register{y1,y2,y3}={dummy,dummy,sin_phi};
    write_registers{x,a(0:4)}={tx_phi,coeff(3)}
    hw_accel_start;
    Intrp:hw_accel_ready;
    read_register{y1,y2,y3}={dummy,dummy,cos_phi};
    g1=tx_g*cos_phi;
    g2=tx_g*sin_phi;
    read_register{tx_fract_delay_offset_path}={dd_i};
    if dd_i+tx_tau>0
        tx_comp_ctrl=1;
    else
        tx_comp_ctrl=0;
    write_register{g1_tx,g2_tx,tx_fract_delay_offset_path,
        tx_sig_comp_ctrl}={g1,g2, abs(dd_i+tx_tau),tx_com-
        p_ctrl};
    }
}//end for
```

At least some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in or on any tangible, non-transitory computer readable medium or media such as magnetic disk, optical disk, RAM, ROM, flash memory, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A transceiver device, comprising:
a transmitter device;
a receiver device;
a loop back path configured to selectively loop back an output of the transmitter device to an input of the receiver device;
a processor device implemented on one or more integrated circuits, the processor device configured to:
control the loop back path to loop back the output of the transmitter device to the input of the receiver device during a first time period,
control one or more of i) the transmitter device and ii) the receiver device to apply a frequency offset between the transmitter device and the receiver device during the first time period such that a signal transmitted during the first time period on an $n^{th}$ subcarrier appears at the receiver device on an $n-m^{th}$ subcarrier, wherein n is a subcarrier index and m is a suitable positive integer,
determine a first imbalance between an in-phase (I) branch in the receiver device and a quadrature-phase (Q) branch in the receiver device based on an image signal received at the receiver device on a $-n+m^{th}$ subcarrier during the first time period while the frequency offset is applied,
calibrate the receiver device based on the determined first imbalance,
after calibrating the receiver device, control the loop back path to loop back the output of the transmitter device to the input of the receiver device during a second time period,
control one or more of i) the transmitter device and ii) the receiver device so that the frequency offset is not applied during the second time period,
determine a second imbalance between an I branch in the transmitter device and a Q branch in the transmitter device based on a signal received at the receiver device during the second time period while the frequency offset is not applied, and
calibrate the transmitter device based on the determined second imbalance.

2. The transceiver device of claim 1, wherein the processor device is configured to
set a frequency of a local oscillator in the transmitter device to a calibration frequency during the first time period such that the signal transmitted during the first time period on the $n^{th}$ subcarrier appears at the receiver device on the $n-m^{th}$ subcarrier, and
set the local oscillator in the transmitter device to an operating frequency during the second time period.

3. The transceiver device of claim 1, wherein the processor device is configured to control a local oscillator in the transmitter device to induce the frequency offset in the local oscillator of the transmitter device.

4. The transceiver device of claim 1, wherein the frequency offset between the transmitter device and the receiver device is equal to $m*\frac{1}{8}*BW$, where
BW is a bandwidth of an operating signal to be received by the receiver device.

5. The transceiver device of claim 4, further comprising a test signal generator device coupled to the transmitter device, wherein the processor device is configured to cause an output of the test signal generator device to be input to the transmitter device during the first time period, wherein the output of the test signal generator device includes the signal transmitted during the first time period on the $n^{th}$ subcarrier.

6. The transceiver device of claim 5, wherein the processor device is configured to
measure, in a received signal at subcarrier n−m, the signal transmitted in the $n^{th}$ subcarrier during the first time period, wherein the signal transmitted in the $n^{th}$ subcarrier during the first time period is a test tone,
measure, in a received signal at subcarrier −n+m, the image signal during the first time period, wherein the image signal is an image of the test tone, and
use at the least i) the measurement of the test tone at subcarrier n−m, and ii) the measurement of the image of the test tone at −n+m to determine the first imbalance.

7. The transceiver device of claim 6, wherein the processor device is configured to
measure, in a received tone at subcarrier n, a test tone transmitted in a subcarrier n during the second time period,
measure, in a received tone at subcarrier −n, an image of the test tone transmitted in the subcarrier n during the second time period, and
use at the least i) the measurement of the test tone at subcarrier n, and ii) the measurement of the image of the test tone at subcarrier −n to determine the second imbalance.

8. The transceiver device of claim 1, wherein the processor device is configured to execute machine readable instructions stored in a non-transitory memory.

9. The transceiver device of claim 1, wherein the transmitter device is configured to utilize orthogonal frequency division multiplexing (OFDM).

10. The transceiver device of claim 1, wherein the receiver device is configured to process an orthogonal frequency division multiplexing (OFDM) signal.

11. A method for calibrating a transceiver, the method comprising:
looping back an output of a transmitter to an input of a receiver during a first time period while applying a frequency offset between the transmitter and the receiver such that a signal transmitted by the transmitter during the first time period on an $n^{th}$ subcarrier appears at the receiver device on an $n-m^{th}$ subcarrier, wherein n is a subcarrier index and m is a suitable positive integer;
determining a first imbalance between an in-phase (I) branch in the receiver and a quadrature-phase (Q) branch in the receiver based on an image signal received at the receiver on a $-n+m^{th}$ subcarrier during the first time period while the frequency offset is applied;
calibrating the receiver based on the determined first imbalance;

after calibrating the receiver, looping back the output of the transmitter to the input of the receiver during a second time period during which the frequency offset is not applied;

determining a second imbalance between an I branch in the transmitter and a Q branch in the transmitter based on a signal received at the receiver during the second time period while the frequency offset is not applied; and calibrating the transmitter based on the determined second imbalance.

12. The method of claim 11, wherein:

applying the frequency offset between the transmitter and the receiver comprises setting a frequency of a local oscillator in the transmitter to a calibration frequency during the first time period such that the signal transmitted during the first time period on the $n^{th}$ subcarrier appears at the receiver device on the $n-m^{th}$ subcarrier; and the frequency of the local oscillator in the transmitter is set to an operating frequency during the second time period.

13. The method of claim 11, wherein applying the frequency offset between the transmitter and the receiver comprises inducing the frequency offset in local oscillator in the transmitter.

14. The method of claim 11, wherein the frequency offset between the transmitter and the receiver is equal to $m*\frac{1}{8}*BW$, where BW is a bandwidth of an operating signal to be received by the receiver.

15. The method of claim 11, wherein looping back the output of the transmitter to the input of the receiver during the first time period comprises looping back a test signal.

16. The method of claim 15, wherein determining the first imbalance comprises:

measuring, in a received signal at subcarrier n−m the signal transmitted in a subcarrier n during the first time period, wherein the signal transmitted in the $n^{th}$ subcarrier during the first time period is a test tone;

measuring, in a received signal at subcarrier −n+m, the image signal during the first time period, wherein the image signal is an image of the test tone; and using at the least i) the measurement of the test tone at subcarrier n−m, and ii) the measurement of the image of the test tone at −n+m to determine the first imbalance.

17. The method of claim 16, wherein determining the second imbalance comprises:

measuring, in a received tone at subcarrier n, a test tone transmitted in a subcarrier n during the second time period;

measuring, in a received tone at subcarrier −n, an image of the test tone transmitted in the subcarrier n during the second time period;

using at the least i) the measurement of the test tone at subcarrier n, and ii) the measurement of the image of the test tone at subcarrier −n to determine the second imbalance.

18. The method of claim 11, wherein the transmitter is configured to utilize orthogonal frequency division multiplexing (OFDM).

19. The method of claim 11, wherein the receiver is configured to process an orthogonal frequency division multiplexing (OFDM) signal.

* * * * *